(12) United States Patent
Kung et al.

(10) Patent No.: US 9,188,818 B2
(45) Date of Patent: Nov. 17, 2015

(54) PIXEL STRUCTURE

(71) Applicant: Au Optronics Corporation, Hsinchu (TW)

(72) Inventors: Yen-Ying Kung, New Taipei (TW); Wei-Cheng Cheng, New Taipei (TW); Sau-Wen Tsao, Taipei (TW); Cho-Yan Chen, Taichung (TW); Tien-Lun Ting, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 159 days.

(21) Appl. No.: 14/028,509

(22) Filed: Sep. 16, 2013

(65) Prior Publication Data

US 2014/0354935 A1    Dec. 4, 2014

(30) Foreign Application Priority Data

Jun. 4, 2013   (TW) .............................. 102119786 A

(51) Int. Cl.
*G02F 1/1343* (2006.01)
*G02F 1/1362* (2006.01)
*G02F 1/1337* (2006.01)

(52) U.S. Cl.
CPC .... *G02F 1/134363* (2013.01); *G02F 1/134336* (2013.01); *G02F 1/13624* (2013.01); *G02F 2001/133742* (2013.01)

(58) Field of Classification Search
USPC ........................................................ 349/141
See application file for complete search history.

(56) References Cited

U.S. PATENT DOCUMENTS

2012/0182514 A1    7/2012  Choi et al.

FOREIGN PATENT DOCUMENTS

| CN | 102253542 | 11/2011 |
|---|---|---|
| CN | 102591050 | 7/2012 |
| JP | 2012118489 | 6/2012 |
| KR | 1189270 | 10/2012 |

*Primary Examiner* — Lucy Chien
(74) *Attorney, Agent, or Firm* — Jianq Chyun IP Office

(57) ABSTRACT

A pixel structure including a first and a second pixel electrode is provided. The first pixel electrode includes a first main portion and first branches. The second pixel electrode includes a second main portion and second branches. The first and second main portions are disposed at an edge of a pixel region. The first and second branches respectively extend from the first and second main portions. The second branches and the first branches are arranged in alternation, and the first branch is parallel to the adjacent second branch. A first opening is formed at neighboring ends of the first main portion and the second main portion. The end of the first main portion has a first bending part, the first bending part is disposed at the edge of the pixel region, and an end of the second branch close to the first opening is surrounded by the first bending part.

11 Claims, 7 Drawing Sheets

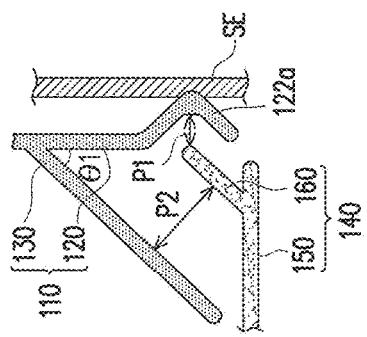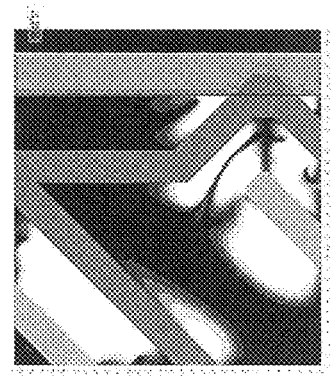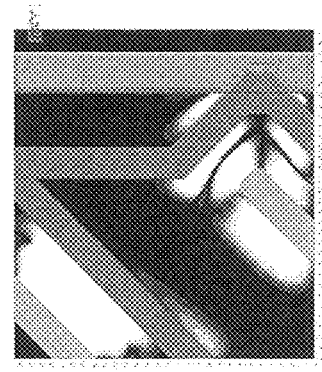
FIG. 6A
FIG. 6B
FIG. 6C
FIG. 6D

PIXEL STRUCTURE

CROSS-REFERENCE TO RELATED APPLICATION

This application claims the priority benefit of Taiwan application serial no. 102119786, filed on Jun. 4, 2013. The entirety of the above-mentioned patent application is hereby incorporated by reference herein and made a part of this specification.

BACKGROUND

1. Technical Field

The invention relates to a pixel structure. Particularly, the invention relates to an in-plane switching pixel structure.

2. Related Art

In a vertical alignment in-plane switching (VA-IPS) display panel, a VA-type liquid crystal is used in collaboration with IPS-type pixel electrodes to achieve both of the characteristics, where the pixel electrode generally has a plurality of branches and a plurality of alignment slits located between the branches. In the VA-IPS display panel, when a voltage is not applied, the liquid crystal molecules are vertically aligned, so that light cannot penetrate there through. When the voltage is applied, an electric field at two edges of each branch of the pixel electrode is stronger, and the liquid crystal molecules at such place tilt at first. However, the electric field at the slit center between the branches of the pixel electrodes is weaker. The liquid crystal molecules at the slit center of the pixel electrodes tilt along the both edges of the branches of the pixel electrodes and conflict to each other, so that the liquid crystal molecules at certain regions are still vertically aligned. Therefore, a disclination line is formed between the branches of the pixel electrode.

Generally, when the applied voltage is switched from a larger voltage to a smaller voltage, if the vertically-aligned liquid crystal molecules exist in the middle of the slit, the liquid crystal molecules at two edges of the slit are pulled by elasticity of liquid crystal to return to a correct tilting direction. However, if the liquid crystal molecules between the branches of the pixel electrode all lie down rather than vertically-aligned, the lying-down liquid crystal molecules in the middle of the slit are simultaneously pulled by elasticity from both edges in opposite directions, so that the lying-down liquid crystal molecules are not easy to return back to a vertically-aligned state. In this way, the disclination line can be abnormal or disappeared, which may result in a phenomenon of image retention of the display panel.

In the commonly used VA-IPS display panel, one pixel structure generally includes two pixel electrodes, and an opening is formed at a junction of the two intersected pixel electrodes. An external electric field probably influence the tilting direction of the internal liquid crystal molecules through the opening. In this way, the originally vertically-aligned liquid crystal molecules located between the pixel electrodes are probably interfered by the external electric field to lie down. Moreover, the lying-down liquid crystal molecules may influence a tilting direction of the other liquid crystal molecules along the disclination line, and result in a fact that the vertically-aligned liquid crystal molecules between the branches of the pixel electrodes sequentially lie down. Namely, the external electric field probably causes abnormity or disappearance of the disclination line, and the liquid crystal display panel has a defect of image retention.

SUMMARY

The invention is directed to a pixel structure, where an external electric field is prevented from influencing a tilting direction of liquid crystal molecules through an opening between pixel electrodes.

The invention provides a pixel structure including a first pixel electrode and a second pixel electrode. The first pixel electrode includes a first main portion and a plurality of first branches. The first main portion is disposed at an edge of a pixel region. The first branches extend from the first main portion. The second pixel electrode is separated from the first pixel electrode. The second pixel electrode includes a second main portion and a plurality of second branches. The second main portion is disposed at the edge of the pixel region. The second branches extend from the second main portion. The second branches and the first branches are arranged in alternation, and the first branch is parallel to the adjacent second branch. A first opening is formed by a first end of the first main portion and that of the second main portion. The first end of the first main portion has a first bending part adjacent to the first opening, the first bending part is disposed at the edge of the pixel region, and an end of the second branch close to the first opening is substantially surrounded by the first bending part.

In an embodiment of the invention, a first pitch is formed between the first bending part and the second branch surrounded by the first bending part, a first acute angle is formed between the first branch close to the first opening and the first main portion, a second pitch is formed between the first branch close to the first opening and the surrounded second branch, and the second pitch is greater than the first pitch.

In an embodiment of the invention, a second opening is formed at a second end of the first main portion and that of the second main portion. The second end of the second main portion has a second bending part adjacent to the second opening. The second bending part is disposed at the edge of the pixel region, and an end of the first branch close to the second opening is substantially surrounded by the second bending part.

In an embodiment of the invention, a third pitch is formed between the second bending part and the first branch surrounded by the second bending part, a second acute angle is formed between the second branch close to the second opening and the second main portion, a fourth pitch is formed between the second branch close to the second opening and the surrounded first branch, and the fourth pitch is greater than the third pitch.

In an embodiment of the invention, the first end of the second branch surrounded by the first bending part substantially extends to the edge of the pixel region.

In an embodiment of the invention, the first bending part and the first branches are located at a same side of an extending virtual line of the first main portion.

In an embodiment of the invention, the end of the second branch surrounded by the first bending part and the connection part between the second branch and the second main portion are respectively located at opposite sides of an extending virtual line of the first main portion.

In an embodiment of the invention, the first bending part extends from one side of the extending virtual line of the first main portion to another side thereof.

In an embodiment of the invention, the first bending part has a recess facing to the pixel region.

In an embodiment of the invention, the recess has an arc shape, a V-shape or a ⊓-shape.

In an embodiment of the invention, the first pitch is smaller than 8 μm, and the second pitch is greater than 10 μm.

According to the above descriptions, in the pixel structure of the invention, the first pixel electrode has a bending part at an opening, and the bending part surrounds the branch of the second pixel electrode. In an embodiment, a stronger electric field can be formed between the bending part and the surrounded branch, such that liquid crystal molecules at the opening have a lying-down arrangement, so as to prevent an external electric field from influencing a tilting direction of the liquid crystal molecules through the opening between the pixel electrodes. Therefore, the design of the bending part prevents the external electric field from influencing the tilting direction of the liquid crystal molecules, and the display panel applying the pixel structure has better display quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A is a partial schematic pixel structure of a LCD panel.

FIG. 6B to FIG. 6D are optical simulation photos of a LCD panel having the pixel structure in bright state of FIG. 6A.

DETAILED DESCRIPTION OF DISCLOSED EMBODIMENTS

Figure 1A:
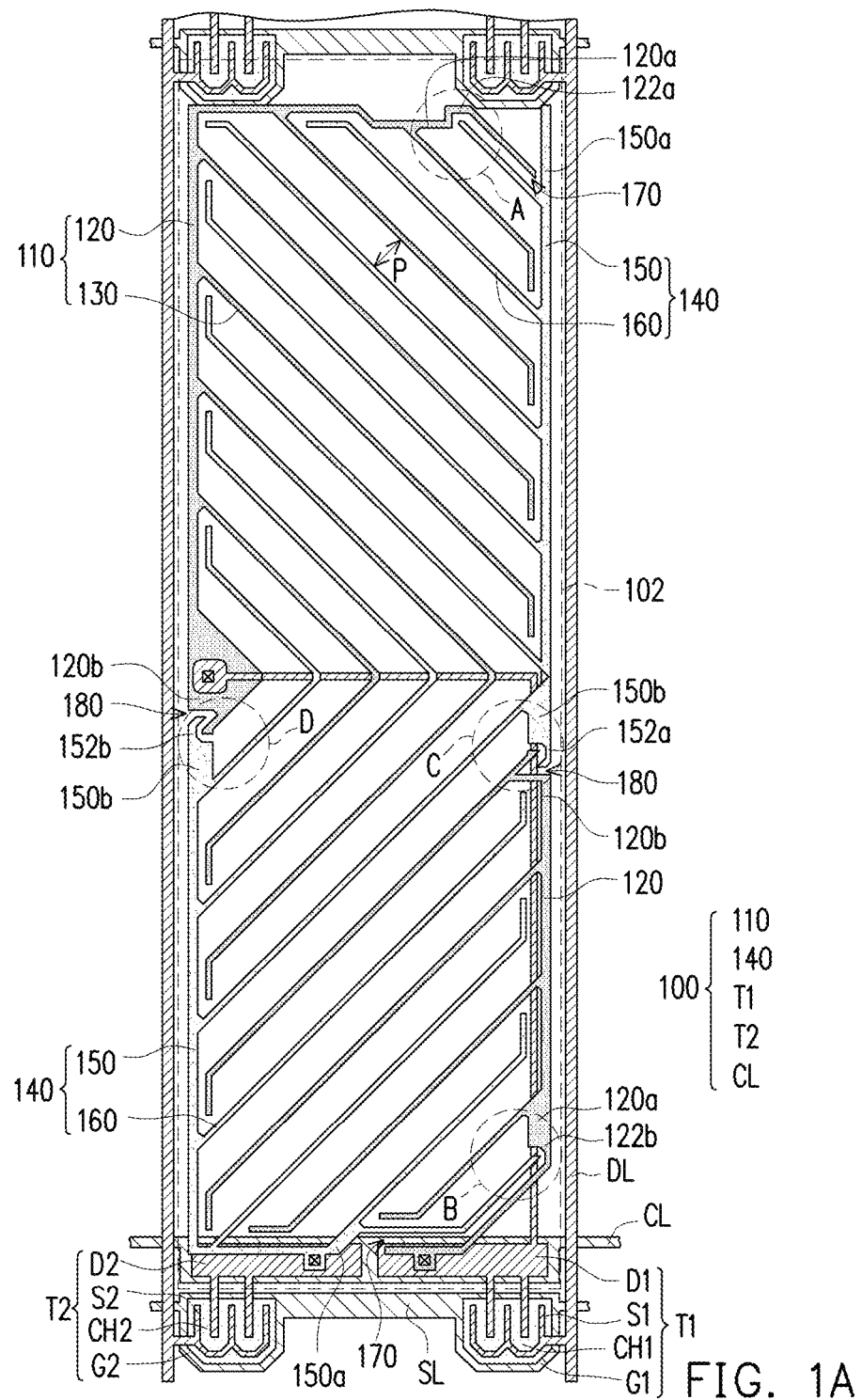
FIG. 1A is a top view of a pixel structure according to an embodiment of the invention.
Figure 1B:
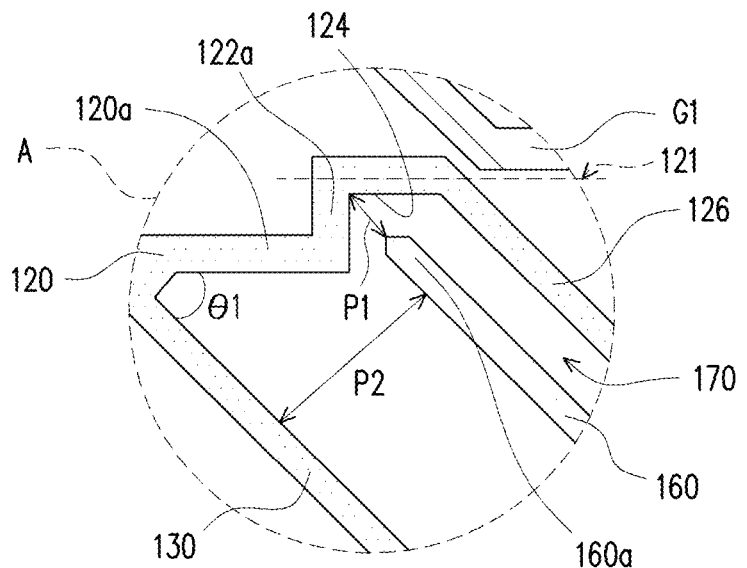
FIG. 1B is an enlarged view of regions A and B in FIG. 1A.
Figure 1B:
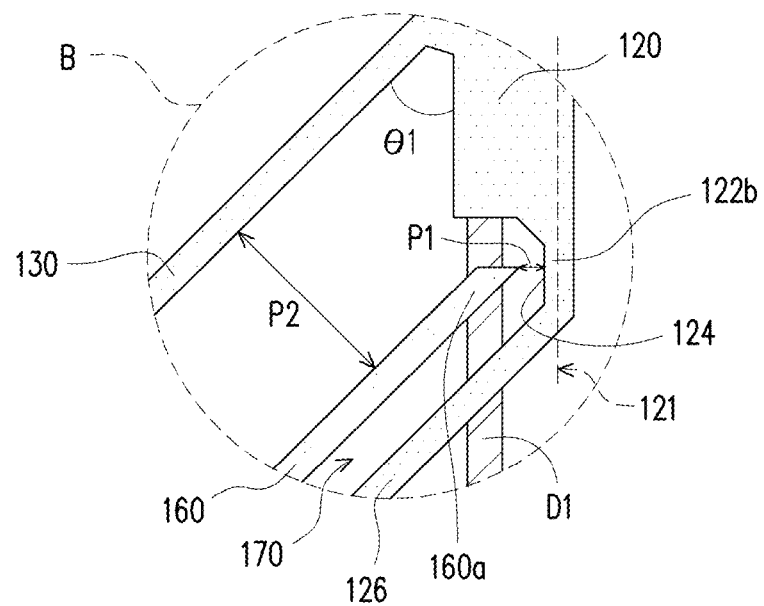
Figure 1C:
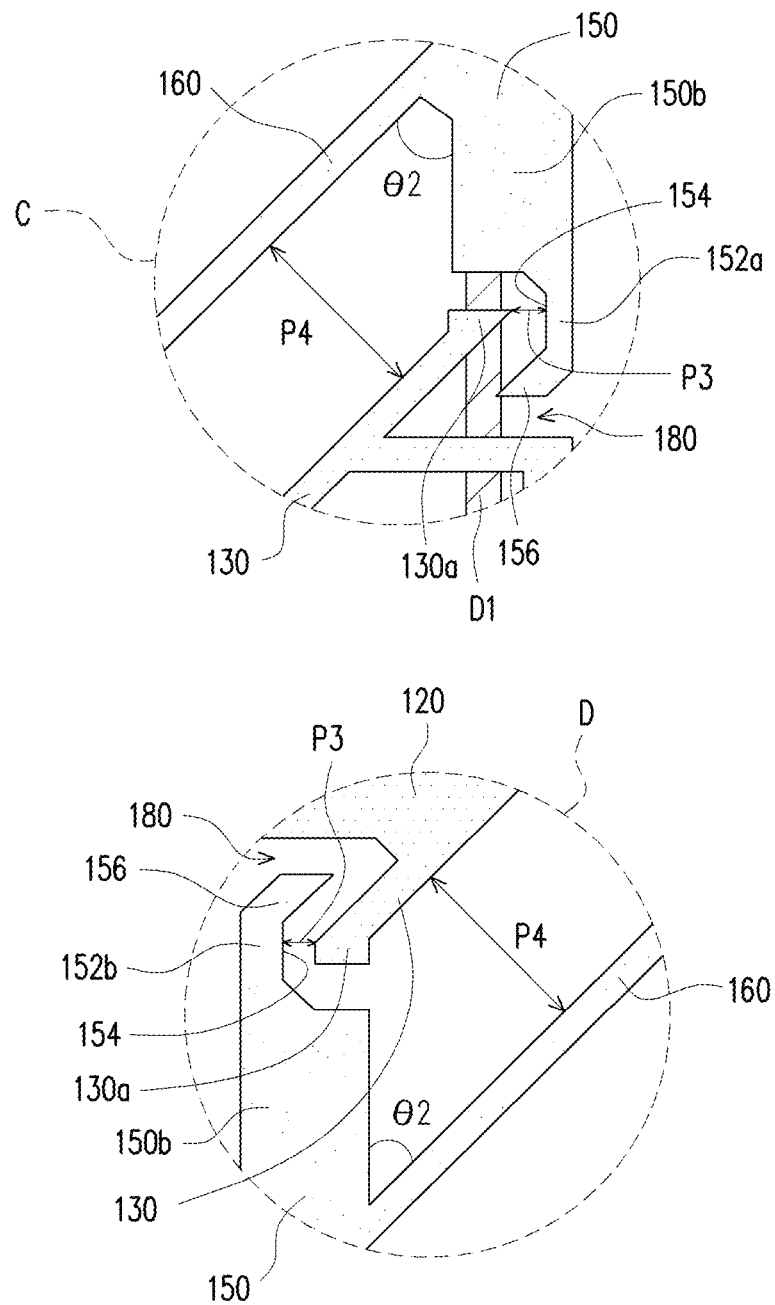
FIG. 1C is an enlarged view of regions C and D in FIG. 1A.

FIG. 1A is a top view of a pixel structure according to an embodiment of the invention, and FIG. 1B and FIG. 1C are respectively enlarged views of regions A and B and regions C and D in FIG. 1A. Referring to FIG. 1A, the pixel structure 100 is disposed in a pixel region 102, and includes a first pixel electrode 110 and a second pixel electrode 140. The pixel structure 100 further includes a first active device T1, a second active device T2 and a common line CL. In the present embodiment, scan lines SL and data lines DL are intersected to define the pixel region 102. The scan line SL is configured to drive the first active device T1 and the second active device T2.

The first pixel electrode 110 includes a first main portion 120 and a plurality of first branches 130. The first main portion 120 is disposed at an edge of the pixel region 102. In the present embodiment, the first main portion 120, for example, extends at a left edge and an upper edge of an upper part of the pixel region 102 and extends at a right edge of a lower part of the pixel region 102. The second pixel electrode 140 is separated from the first pixel electrode 110. The second pixel electrode 140 includes a second main portion 150 and a plurality of second branches 160. The second main portion 150 is disposed at the edge of the pixel region 102. In the present embodiment, the second main portion 150, for example, extends at a right edge of the upper part of the pixel region 102 and extends at a left edge and a lower edge of the lower part of the pixel region 102. The first branches 130 are connected to the first main portion 120, and extend from the first main portion 120. The second branches 160 extend from the second main portion 150. The second branches 160 and the first branches 130 are arranged in alternation, and the first branch 130 is parallel to the adjacent second branch 160. Namely, one of the second branches 160 is disposed between two adjacent first branches 130. Similarly, one of the first branches 130 is disposed between two adjacent second branches 160. Therefore, the first pixel electrode 110 and the second pixel electrode 140 are respectively comb-shape patterns, so as to achieve a configuration of in-plane switching (IPS) pixel electrodes.

Referring to FIG. 1A and FIG. 1B, a first opening 170 is formed by a first end 120a of the first main portion 120 and a first end 150a of the second main portion 150. In other words, the first opening 170 is formed at neighboring first ends 120a and 150a of the first main portion 120 and the second main portion 150. The so-called first ends 120a and 150a are substantially located at a junction of the first main portion 120 and the second main portion 150, so that the first opening 170 is formed at the junction of the first pixel electrode 110 and the second pixel electrode 140. The first end 120a of the first main portion 120 has a first bending part 122a or 122b adjacent to the first opening 170. An end 160a of the second branch 160 close to the first opening 170 is substantially surrounded by the first bending part 122a or 122b as shown in FIG. 1B. In the present embodiment, the first bending part 122a or 122b for example, has a recess 124, where the recess 124 to accommodate the end 160a of the second branch 160. In other words, the end 160a of the second branch 160 is substantially located in the recess 124. In the present embodiment, the recess 124 of the first bending part 122a is, for example, formed by bending the first end 120a of the first main portion 120. The recess 124 of the first bending part 122b is, for example, formed by narrowing a line width of the first end 120a of the first main portion 120. In other words, as long as the first bending part 122a or 122b can surround the end 160a of the second branch 160, the first bending part 122a or 122b may have a variety of configurations. Moreover, the recess 124 of the first bending part 122a or 122b approximately has an arc shape, a V-shape, a ⊓-shape or other shapes. In addition, the end of the first bending part 122a or 122b, for example, has an extending portion 126, and the extending portion 126 is, for example, parallel to the adjacent second branches 160.

Figure 2A:
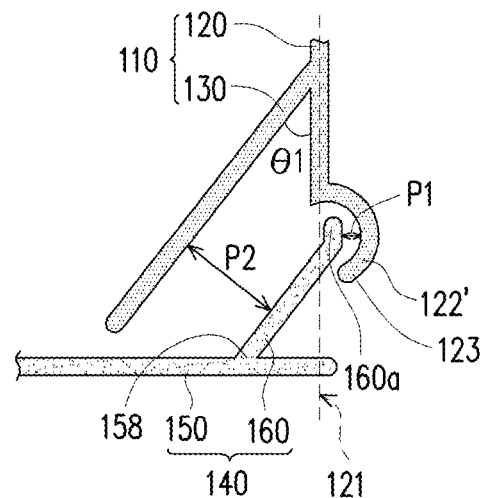
FIG. 2A and FIG. 2B are partial top views of a pixel electrode according to an embodiment of the invention.

In the present embodiment, as shown in FIG. 1B, viewing from an extending virtual line 121 of the first main portion 120, a part (i.e. extending portion 126) of the first bending part 122a or 122b and the first branches 130 are, for example, located at a same side of the extending virtual line 121. In other words, the part (i.e. extending portion 126) of the first bending part 122a or 122b and the first branches 130 are located at a same side of the extending virtual line 121 of the first main portion 120. However, in other embodiments, as that shown in FIG. 2A, a part 123 of the first bending part 122' and the first branch 130 can be located at different sides of the extending virtual line 121 of the first main portion 120, i.e. located at two opposite sides of the extending virtual line 121.

Figure 2B:
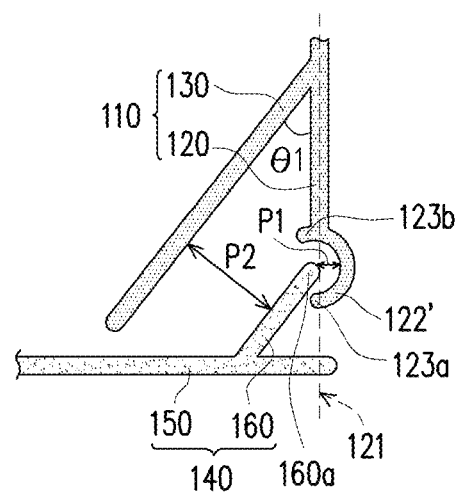

Moreover, the end 160a of the second branch 160 substantially extends to pass through the extending virtual line 121, i.e. extends from one side of the extending virtual line 121 to another side thereof. In other words, the end 160a of the second branch 160 surrounded by the first bending part 122a or 122b and the connection part 158 between the second branch 160 and the second main portion 150 are respectively located at opposite sides of the extending virtual line 121 of the first main portion 120. Alternatively, as that shown in FIG. 2B, the first bending part 122' can be simultaneously located at two opposite sides of the extending virtual line 121, i.e. a part 123a of the first bending part 122' is located at one side of the extending virtual line 121 and the other part 123b of the first bending part 122' is located at the other side of the extending virtual line 121, and the end 160a of the second branch 160 substantially extends to be very close to the extending virtual line 121 without passing through the extending virtual line 121.

A first pitch P1 is formed between the first bending parts 122a, 122b and the second branch 160 surrounded by the first bending parts 122a, 122b. The first pitch P1 for example, is the smallest distance between the end 160a of the second branch 160 and the first bending part 122a or 122b. A first acute angle θ1 is formed between the first branch 130 close to the first opening 170 and the first main portion 120, and a second pitch P2 is formed between the first branch 130 close to the first opening 170 and the surrounded second branch 160, where the second pitch P2 is greater than the first pitch P1. The second pitch P2 for example, is the distance between the parallel first branch 130 and its adjacent second branch 160. In the present embodiment, the first acute angle θ1 is 30-60 degrees, which is, for example, 45 degrees, though the invention is not limited thereto. The first pitch P1 is smaller than 8 μm, which is, for example, 4 μm. The second pitch P2 is greater than 10 μm, which is, for example, 10-30 μm. In the present embodiment, a pitch P is formed between the other first branch 130 and the adjacent second branch 160, and the second pitch P2 is, for example, equal to the pitch P. In the present embodiment, the second pitch P2 is, for example, 17 μm. The multiple pitches of the electrode may produce a better sideview optical performance, and the pitch P between the first branch 130 and the adjacent second branch 160 is not limited by the invention.

Referring to FIG. 1A and FIG. 1C, in the present embodiment, a second opening 180 is formed at a second end 120b of the first main portion 120 and a second end 150b of the second main portion 150. In other words, the second opening 180 is formed at neighboring second ends 120b and 150b of the first main portion 120 and the second main portion 150. The so-called neighboring second ends 120b and 150b are substantially located at a junction of the first main portion 120 and the second main portion 150, so that the second opening 180 is formed at the junction of the first pixel electrode 110 and the second pixel electrode 140. The second end 150b of the second main portion 150 has second bending part 152a or 152b adjacent to the second opening 180, and an end 130a of the first branch 130 close to the second opening 180 is substantially surrounded by the second bending part 152a or 152b. In the present embodiment, the second bending part 152a or 152b for example, has a recess 154, where the recess 154 faces to the pixel region 102 to accommodate the end 130a of the first branch 130. In other words, the end 130a of the first branch 130 is substantially located in the recess 154. In the present embodiment, the recess 154 of the second bending part 152a or 152b is, for example, formed by narrowing a line width of the second end 150b of the second main portion 150. Moreover, the ends of the second bending part 152a or 152b, for example, has an extending portion 156, and the extending portion 156 is, for example, parallel to the adjacent first branches 130. However, the second bending part 152a or 152b may have a similar structure or configuration with that of the first bending part 122a or 122b, which is not repeated.

A third pitch P3 is formed between the second bending part 152a or 152b and the first branch 130 surrounded by the second bending part 152a or 152b. The third pitch P3 for example, is the smallest distance between the end 130a of the first branch 130 and the second bending part 152a or 152b. A second acute angle θ2 is formed between the second branch 160 close to the second opening 180 and the second main portion 150, and a fourth pitch P4 is formed between the second branch 160 close to the second opening 180 and the surrounded first branch 130, where the fourth pitch P4 is greater than the third pitch P3. In the present embodiment, the second acute angle θ2 is 30-60 degrees, which is, for example, 45 degrees, though the invention is not limited thereto. The third pitch P3 is, for example, smaller than 8 μm, and the fourth pitch P4 is, for example, greater than 10 μm. Moreover, in the present embodiment, a pitch P is formed between the other first branch 130 and the adjacent second branch 160, and the second pitch P4 is, for example, equal to the pitch P. Other first branches 130 and the adjacent second branches 160 may have the same pitch. However, the pitch between the first branch 130 and the adjacent second branch 160 is not limited by the invention, and in order to pursue a better sideview optical performance, a combination of multiple pitches can be applied, i.e. the pitches can be linearly or non-linearly varied.

Particularly, in the present embodiment, the pixel structure 100 includes the two pixel electrodes 110 and 140, and the bending parts 122a, 122b, 152a and 152b are designed near the openings 170 and 180 formed at the junction of the two pixel electrodes 110 and 140, though the invention is not limited thereto. In other words, in other embodiments, the pixel structure may also have more pixel electrodes, and a bending part is disposed at one of the junctions of the pixel electrodes. Moreover, in the present embodiment, although a situation that one of the bending parts 122a, 122b, 152a and 152b is disposed at each of the openings 170 and 180 is taken as an example for descriptions, the bending part can be only disposed at one opening according to an actual requirement. In other words, the bending part is disposed at one or more openings. Moreover, in the present embodiment, although a situation that the first pixel electrode 110 and the second pixel electrode 140 all have the bending parts 122a, 122b, 152a and 152b is taken as an example for descriptions, a situation that only the first pixel electrode or the second pixel electrode has at least one bending part is also applicable according to an actual requirement. In other words, at least one of the pixel electrodes has the bending part.

In the present embodiment, the first pixel electrode 110 is electrically connected to the first active device T1, and the second pixel electrode 140 is electrically connected to the second active device T2. In detail, the first active device T1 and the second active device T2 are electrically connected to the data line DL. The first active device T1 includes a first gate G1, a first channel layer CH1, a first source S1 and a first drain D1, where the first gate G1 is electrically connected to the scan line SL, and the first source S1 is electrically connected the data line DL. In the present embodiment, the first pixel electrode 110 is electrically connected to the first drain D1. The second active device T2 includes a second gate G2, a second channel layer CH2, a second source S2 and a second drain D2, where the second gate G2 is electrically connected to the scan line SL, and the second source S2 is electrically connected the data line DL. In the present embodiment, the second pixel electrode 140 is electrically connected to the second drain D2. The common line CL is parallel to the scan line SL.

In the present embodiment, a material of the first pixel electrode 110 and the second pixel electrode 140 can be a transparent conductive material or an opaque conductive material. The transparent conductive material includes a metal oxide, for example, indium tin oxide, indium zinc oxide, aluminum tin oxide, aluminum zinc oxide, indium germanium zinc oxide, other suitable oxides or a stacked layer of at least two of the above materials. The opaque conductive material includes metal.

Figure 3:
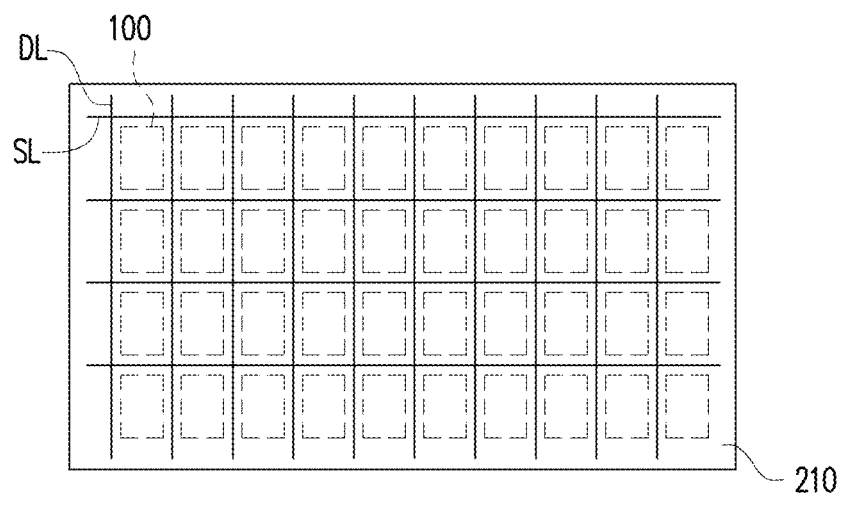
FIG. 3 is a top view of an active device array substrate according to an embodiment of the invention.

FIG. 3 is a top view of an active device array substrate according to an embodiment of the invention. Referring to FIG. 3, the active device array substrate 200 includes a substrate 210, a plurality of scan lines SL, a plurality of data lines DL and a plurality of pixel structures 100 disposed on the substrate 210. The scan lines SL and the data lines DL are electrically connected to the corresponding pixel structures 100. The pixel structures 100 are, for example, arranged on the substrate 210 in an array. Since the active device array substrate 200 includes the pixel structures 100 of the aforementioned embodiment, the active device array substrate 200 is a vertical alignment in-plane switching (VA-IPS) active device array substrate.

Figure 4:
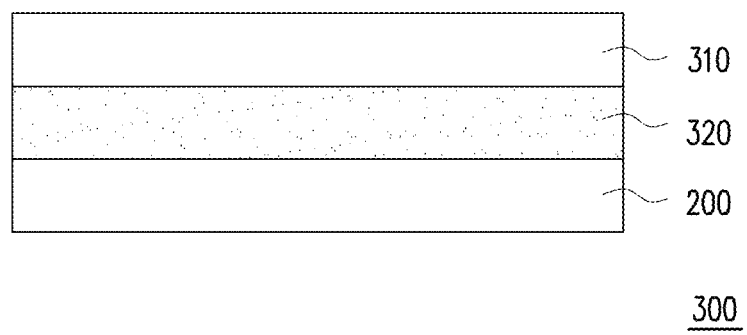
FIG. 4 is a cross-sectional view of a liquid crystal display (LCD) panel according to an embodiment of the invention.

FIG. 4 is a cross-sectional view of a liquid crystal display (LCD) panel according to an embodiment of the invention. Referring to FIG. 4, the LCD panel 300 includes the active device array substrate 200 of FIG. 3, an opposite substrate 310 and a liquid crystal layer 320. The active device array substrate 200 includes a plurality of pixel structures 100. The liquid crystal layer 320 is disposed between the active device array substrate 200 and the opposite substrate 310. The liquid crystal layer 320 is, for example, a VA liquid crystal layer. Therefore, the LCD panel 200 is, for example, a VA-IPS display panel.

In the aforementioned embodiment, the design is performed in allusion to the openings 170 and 180 near the junction between the first main portion 120 of the first pixel electrode 110 and the second main portion 150 of the second pixel electrode 140, such that the smaller pitches P1 and P3 which are smaller then pitches P2 and P4 are formed between the bending parts 122a, 122b, 152a and 152b and the branches 130 and 160 surrounded by the bending parts 122a, 122b, 152a and 152b, and the larger pitches P2 and P4 are formed between the branches 130 and 160 close to the openings 170 and 180 and the surrounded branches 130 and 160. In this way, a weaker electric field is formed between the branch 130 and the surrounded branch 160 and between the branch 160 and the surrounded branch 130 due to the larger pitches P2 and P4, so that the liquid crystal molecules at a place corresponding to the larger pitches P2 and P4 may be vertically aligned to block interference of an external electric field. Moreover, at the openings 170 and 180, a stronger electric field is formed between the bending parts 122a, 122b, 152a, 152b and the surrounded ends 130a and 160a due to the smaller pitches P1 and P3, so that the liquid crystal molecules at a place corresponding to the smaller pitches P1 and P3 have a lying-down arrangement, and the lying-down arranged liquid crystal molecules form a blocking wall to prevent the external electric field from influencing a tilting direction of the liquid crystal molecules through the openings 170 and 180. Namely, by designing the bending parts at the openings, and controlling the sizes of the pitches between the bending parts and the surrounded branches and between the surrounded branches and the adjacent branches, the external electric field is effectively prevented from influencing the tilting direction of the liquid crystal molecules. Therefore, the aforementioned pixel structure can effectively control the tilting direction of the liquid crystal molecules, and is adapted to the IPS LCD panels such as the VA-IPS LCD panel. In this way, the LCD panel is avoided to have a defect of image retention, and the LCD panel applying such pixel structure may have better display quality.

Figure 5A:
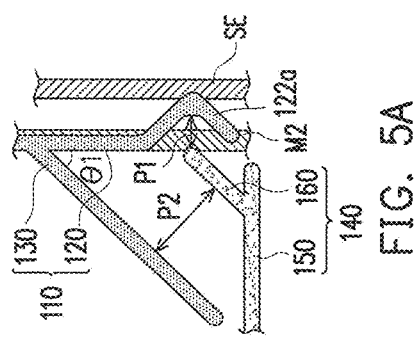
FIG. 5A is a partial schematic pixel structure of a LCD panel.
Figure 5D:
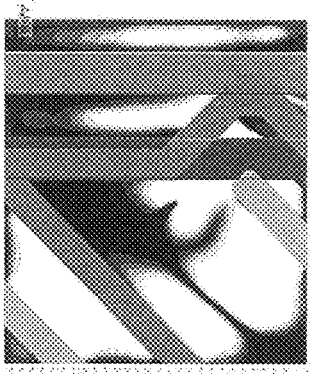
FIG. 5B to FIG. 5D are optical simulation photos of a LCD panel having the pixel structure in bright state of FIG. 5A.
Figure 5C:
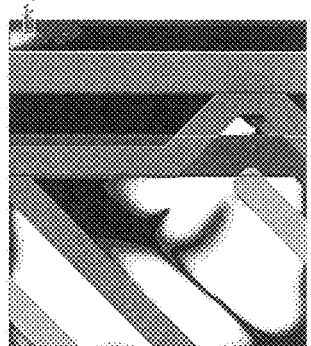
Figure 5B:

Simulation is performed on the LCD panel having the aforementioned pixel structure to verify the advantages of the aforementioned embodiments. FIG. 5A is a partial schematic pixel structure of a LCD panel. The region shown in FIG. 5A is around the opening 170 formed by the two pixel electrodes 110 and 140, in which descriptions of various components besides a shielding electrode SE and an electrode M2 can refer to related descriptions of FIG. 1B, and details thereof are not repeated. The electrode M2 is electrically connected to the drain D1 of the first active device T1, and the electrode M2 is, for example, formed together with the drain D1 of the first active device T1 in the same patterning process. The shielding electrode SE is not shown in FIG. 1A, and the shielding electrode SE can be formed or not formed according to an actual requirement. The shielding electrode SE is, for example, formed together with the common line CL in the same patterning process and is located between the electrode M2 and the data line DL. In the pixel structure shown in FIG. 5A, the shielding electrode SE is used to simulate an external electrode that probably influences the tilting direction of the liquid crystal molecules. Moreover, since the LCD panel used for simulation has a non-COA structure, the electrode M2 located under the pixel electrode 110 is further illustrated. FIG. 5B to FIG. 5D are optical simulation photos of a LCD panel having the pixel structure of FIG. 5A in bright state, where voltages applied to the pixel structures of FIG. 5B to FIG. 5D are respectively 13.25V, 14.5V and 16V. It is noted that the two pixel electrodes, the shielding electrode and the electrode and the relative position thereof in FIG. 5B to FIG. 5D are identical to the two pixel electrodes 110 and 140, the shielding electrode SE and the electrode M2 in FIG. 5A. For simplicity's sake, a region between the first bending part 122a and the second branch 160 surrounded by the first bending part 122a is referred to as a small pitch region, and a region having the first acute angle θ1 is referred to as an acute angle region, where the small pitch region has a relatively stronger electric field, and the acute angle region has a relatively weaker electric field, and formation of the stronger electric field and the weaker electric field can refer to the aforementioned related descriptions, which is not repeated.

First, with reference to FIG. 5A simultaneously, as that shown in FIG. 5B, when the applied voltage is 13.25V, the small pitch region has a disclination line formed by the vertically-aligned liquid crystal molecules. Then, with reference to FIG. 5A simultaneously, as that shown in FIG. 5C, when the applied voltage is increased to 14.5V, the liquid crystal molecules in the small pitch region start to all lie down while the weak electric field of the acute angle region makes the liquid crystal molecules to continually be vertically aligned, so that the acute angel region still has a blocking effect. Then, referring to FIGS. 5A and 5D simultaneously, when the applied voltage is increased to 16V, although an area of the vertically-aligned liquid crystal molecules in the acute region is decreased, since the liquid crystal molecules at the opening (i.e. in the small pitch region) have all lied down, the disturbance of the external electric field cannot cause a deformation of the lying-down liquid crystal molecules located at the opening. In other words, the design of the bending parts and the pitches in the pixel electrodes can effectively prevent the external electric field from influencing the tilting direction of the liquid crystal molecules.

FIG. 6A is a partial schematic pixel structure of a LCD panel used for simulation. A difference between FIG. 6A and FIG. 5A is that the LCD panel of the present embodiment has a COA structure, so that the pixel structure does not include the electrode M2 under the pixel electrode. FIG. 6B to FIG. 6D are optical simulation photos of a LCD panel having the pixel structure of FIG. 6A in bright state, where voltages applied to the pixel structures of FIG. 6B to FIG. 6D are respectively 11V, 11.5V and 14.5V. It is noted that the two pixel electrodes and the shielding electrode and the relative position thereof in FIG. 6B to FIG. 6D are identical to the two pixel electrodes 110 and 140 and the shielding electrode SE in FIG. 6A. First, with reference to FIG. 6A simultaneously, as that shown in FIG. 6B, when the applied voltage is 11V, the small pitch region has the disclination line formed by the vertically-aligned liquid crystal molecules. Then, with reference to FIG. 6A simultaneously, as that shown in FIG. 6C, when the applied voltage is increased to 11.5V, the liquid crystal molecules in the small pitch region start to all lie down while the weak electric field of the acute angle region makes the liquid crystal molecules to continually be vertically aligned, so that the acute angel region still has the blocking effect. Then, referring to FIGS. 6A and 6D simultaneously, when the applied voltage is increased to 14.5V, although an area of the vertically-aligned liquid crystal molecules in the acute region is decreased, since the liquid crystal molecules at the opening (i.e. in the small pitch region) have all lied down, the disturbance of the external electric field cannot cause a deformation of the lying-down liquid crystal molecules located at the opening. In other words, the design of the bending parts and the pitches can effectively prevent the external electric field from influencing the tilting direction of the liquid crystal molecules. According to the above examples, it is known that the design of the bending parts and the pitches can effectively prevent the external electric field from influencing the tilting direction of the liquid crystal molecules.

In summary, in the pixel structure of the invention, the first pixel electrode has a bending part at the opening, and the bending part surrounds the branch of the second pixel electrode. In an embodiment, by designing the pitch between the bending part and the surrounded branch to be smaller than the pitch between the surrounded branch and the adjacent branch, the place close to the opening has a stronger electric field compared to that of the acute angle region. In this way, the liquid crystal molecules located at the opening have a lying-down arrangement due to the stronger electric field, so as to form a blocking wall to prevent the external electric field from influencing a tilting direction of the liquid crystal molecules through the opening between the pixel electrodes. Therefore, even if the number of the lying-down liquid crystal molecules in the acute angle region is decreased due to increase of the voltage, since there are the lying-down arranged liquid crystal molecules at the opening, the external electric field is prevented from influencing the tilting direction of the liquid crystal molecules in the acute angle region through the opening. Namely, the pixel structure of the present embodiment can effectively control the tilting direction of the liquid crystal molecules, and is adapted to the IPS LCD panels such as the VA-IPS LCD panel. In this way, the LCD panel is avoided to have a defect of image retention, and the LCD panel applying such pixel structure may have better display quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A pixel structure, comprising:
   a first pixel electrode, including:
      a first main portion, disposed at an edge of a pixel region; and
      a plurality of first branches, extending from the first main portion; and
   a second pixel electrode, separated from the first pixel electrode, and including:
      a second main portion, disposed at the edge of the pixel region; and
      a plurality of second branches, extending from the second main portion, the second branches and the first branches being arranged in alternation, and the first branch being parallel to the adjacent second branch,
   wherein a first opening is formed by a first end of the first main portion and that of the second main portion, the first end of the first main portion has a first bending part adjacent to the first opening, the first bending part is disposed at the edge of the pixel region, and an end of the second branch close to the first opening is substantially surrounded by the first bending part,
   wherein a first pitch is formed between the first bending part and the second branch surrounded by the first bending part, a second pitch is formed between the first branch close to the first opening and the surrounded second branch, and the first pitch is smaller than 8 μm, the second pitch is greater than 10 μm.

2. The pixel structure as claimed in claim 1, a first acute angle is formed between the first branch close to the first opening and the first main portion.

3. The pixel structure as claimed in claim 1, wherein a second opening is formed at a second end of the first main portion and that of the second main portion, the second end of the second main portion has a second bending part adjacent to the second opening, the second bending part is disposed at the edge of the pixel region, and an end of the first branch close to the second opening is substantially surrounded by the second bending part.

4. The pixel structure as claimed in claim 3, wherein a third pitch is formed between the second bending part and the first branch surrounded by the second bending part, a second acute angle is formed between the second branch close to the second opening and the second main portion, a fourth pitch is formed between the second branch close to the second opening and the surrounded first branch, and the fourth pitch is greater than the third pitch.

5. The pixel structure as claimed in claim 1, wherein the first end of the second branch surrounded by the first bending part substantially extends to the edge of the pixel region.

6. The pixel structure as claimed in claim 1, wherein the first bending part and the first branches are located at a same side of an extending virtual line of the first main portion.

7. The pixel structure as claimed in claim 1, wherein the end of the second branch surrounded by the first bending part and the connection part between the second branch and the second main portion are respectively located at opposite sides of an extending virtual line of the first main portion.

8. The pixel structure as claimed in claim 1, wherein the first bending part extends from one side of the extending virtual line of the first main portion to another side thereof.

9. The pixel structure as claimed in claim 1, wherein the first bending part has a recess facing to the pixel region.

10. The pixel structure as claimed in claim 9, wherein the recess has an arc shape, a V-shape or a ⊓-shape.

11. The pixel structure as claimed in claim 1, wherein the second branches are electrically connected to an active device, and the second branches extend away from the active device.

\* \* \* \* \*